United States Patent [19]

Mouri et al.

[11] Patent Number: 4,710,881
[45] Date of Patent: Dec. 1, 1987

[54] KNOCK CONTROL APPARATUS FOR INTERNAL COMBUSTION ENGINE

[75] Inventors: Yasunori Mouri; Noboru Sugiura, both of Katsuta, Japan

[73] Assignee: Hitachi, Ltd., Tokyo, Japan

[21] Appl. No.: 868,441

[22] Filed: May 30, 1986

Related U.S. Application Data

[63] Continuation of Ser. No. 458,455, Jan. 17, 1983, abandoned.

[30] Foreign Application Priority Data

Jan. 18, 1982 [JP] Japan .................................. 57-4997

[51] Int. Cl.⁴ ................................................ F02P 5/14
[52] U.S. Cl. .............................. 364/431.08; 123/422; 123/425; 364/431.07
[58] Field of Search ..................... 364/431.07, 431.08; 123/425, 422, 492; 73/35

[56] References Cited

U.S. PATENT DOCUMENTS

| | | | |
|---|---|---|---|
| 4,002,155 | 1/1977 | Harned et al. | 123/425 |
| 4,428,343 | 1/1984 | Schweikert et al. | 123/425 |
| 4,458,646 | 7/1984 | Suzuki et al. | 123/422 |
| 4,513,716 | 4/1985 | Hauguchi et al. | 123/422 |

*Primary Examiner*—P. S. Lall
*Attorney, Agent, or Firm*—Antonelli, Terry & Wands

[57] ABSTRACT

A knock control apparatus for internal combustion engines includes a plurality of sensors for generating signals indicative of the operating conditions of an engine, a plurality of actuators responsive to control signals to control the respective energy conversion functions of the engine, a data processing unit responsive to the signals from the sensors to perform engine controlling data processing operations and thereby supply engine control values to the actuators, and a knock sensing unit for detecting the occurrence of knocking in the engine and generating knock detection signals, and the data processing unit is responsive to the knock detection signals from the knock sensing unit to retard the calculated ignition timing. When the acceleration of the engine is detected in accordance with the output signal of the sensor, the data processing unit increases, in accordance with the knock detection signals, an amount of ignition timing retard to be calculated over an amount of retard to be calculated in accordance with the knock detection signals during the steady operation of the engine.

21 Claims, 19 Drawing Figures

KNOCK CONTROL APPARATUS FOR INTERNAL COMBUSTION ENGINE

This is a continuation of application Ser. No. 458,455, filed Jan. 17, 1983, now abandoned.

BACKGROUND OF THE INVENTION

The present invention relates to knock control apparatus for internal combustion engines, and, more particularly, to a knock control apparatus for controlling an occurrence of knock during the acceleration of an engine.

Engine knock may cause a melting of the pistons or the exhaust valves and other damage to an internal combustion engine. Thus, with the conventional ignition systems for engines, to prevent the occurrence of serious troubles due to knocking, an ignition timing control method has been proposed which establishes a retarded actual ignition timing. The knocking in the engine causes, in addition to knocking sound, a reverse torque which decreases the power output of the engine or an overheating of the engine. There is a close relationship between the knocking and, the ignition timing and from the engine characteristic point of view, the maximum power output of the engine can be obtained by setting the actual ignition timing or the ignition advance angle at a point just before prior to the point at that which a knocking occurs. As a result, to greatly retard the ignition timing or to decrease the ignition advance angle so as prevent the occurrence of knocking has the converse effect of decreasing the engine output and there is a need to control the ignition timing at a point just prior to the occurrence of knocking.

A known knock control apparatus removes an ignition-induced ignition noise by masking the noise from the output signal of a knock sensor to detect a knock signal and the ignition timing is retarded a predetermined angle in accordance with the detected knock signal. In other words, the ignition timing is retarded a predetermined angle of, for example, 4°, in response to the knock during the interval between the adjacent two ignition timings. More specifically, whether the ignition timing is to be retarded is determined in dependence upon the presence or absence of a knock signal and the ignition timing is retarded a predetermined angle in a stepwise manner (a so-called stepping retard method) in response to the detection of every knocking condition.

Generally, during the period of acceleration from an idling condition of the engine, the frequency knocking is high and there is a greater tendency for heavy knocking to continuously occur. With the known knock control apparatus, however, when the engine knocks, the knocking is eliminated by retarding the ignition timing of the engine a predetermined amount irrespective of the engine operating range or the engine speed. Consequently, if the amount of retard of the ignition timing for the engine is set to a value suitable to prevent the occurrence of knocking at the low engine speeds, the ignition timing characteristics for preventing the occurrence of knocking at the intermediate and high engine speeds is unsatisfactory and it is impossible to ensure satisfactory engine performance. Thus, it is the general practice to set the amount of retard upon occurrence of knocking to a value suitable for preventing the occurrence of knocking at the intermediate and high engine speeds.

As a result, when knocking occurs, the ignition timing is retarded a predetermined number of degrees and controlled at a value which eliminates the knocking. In other words, the ignition timing is retarded a predetermined number of degrees in response to every knocking condition and the retardation of the ignition timing is continued until the knocking is eliminated. The ignition timing at which the knocking is eliminated does not necessarily represent the optimum ignition position and thereafter the electronic advance function again comes into action thereby advancing the ignition timing in the conventional manner.

However, this type of known method is disadvantageous in that during the acceleration of an engine where knocking occurs continuously, the amount of ignition timing retard per knocking condition becomes insufficient thereby deteriorating the control response to the knocking and considerably degrading the running performance. A primary object of the present invention resides in providing a knock control apparatus for internal combustion engines capable of preventing the occurrence of heavy knocking during the acceleration of an engine.

To accomplish the above object, in accordance with the invention, means are provided for detecting the acceleration condition of an engine so that, upon detection of the acceleration condition, the amount of retard of ignition timing provided upon occurrence of knocking is increased as compared with that provided during the steady state operating condition of the engine, that is, an operating condition other than the acceleration condition.

BRIEF DESCRIPTION OF THE DRAWINGS

The above and other objects, features and advantages of the present invention will be more apparent from the following description when taken in connection with the accompanying drawings, wherein:

FIGS. 4A–4I show a plurality of waveforms depicting the operation of the knock control apparatus shown in FIG. 2;

Figure 1:
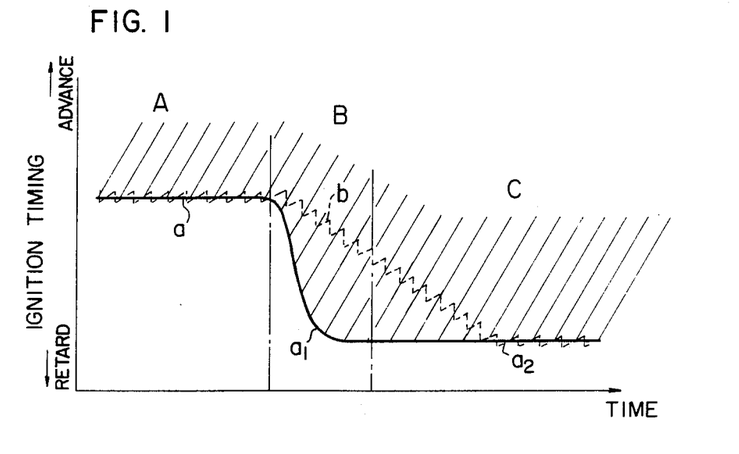
FIG. 1 is a graphical illustration of a relationship between operating conditions and ignition timing of an internal combustion engine.

Referring now to the drawings wherein like reference numerals are used throughout the various views to designate like parts and, more particularly, to FIG. 1, according to this figure, an ignition timing region A, that is a region wherein the engine knocks, is above a limiting line a in the normal operating range of the engine. However, it has been confirmed that, in the acceleration operation range B of the engine, the borderline region conducive to engine knocking varies abruptly as indicated by the line designated $a_1$, and it becomes constant in a high speed region C following the end of the acceleration as shown by the line designated $a_2$. In this manner, the ignition timing region conducive to knocking varies abruptly in the acceleration operation range B. However, with the known knock control methods, the amount of ignition timing retard provided upon the occurrence of knocking during acceleration is insufficient so that, as shown by the curve b in FIG. 1, the ignition timing control value is delayed so as to follow the knocking limit line $a_1$ and, therefore, the actual ignition timing control value remains in the region conducive to engine knocking.

Figure 2:
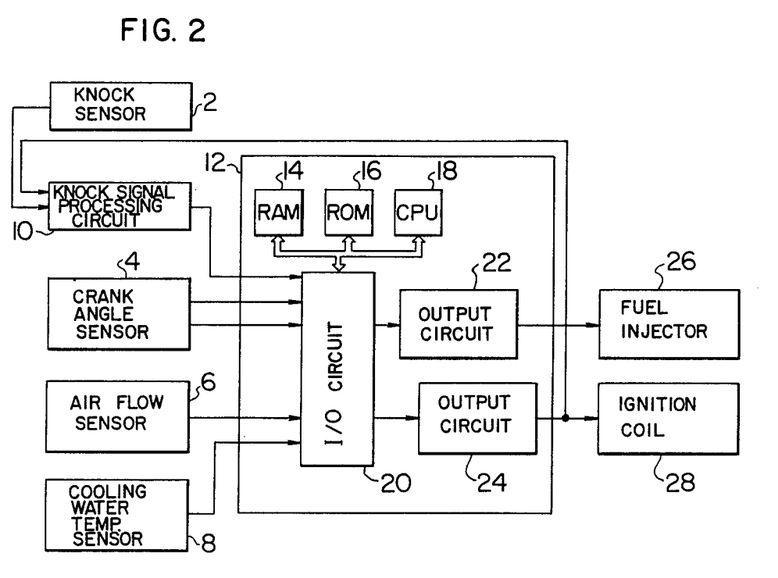
FIG. 2 is a block diagram of a knock control apparatus for internal combustion engines according to the invention wherein an ignition timing retard provided upon occurrence of a knocking condition is controlled by a microcomputer.

As shown most clearly in FIG. 2, a crank angle sensor 4, an air flow sensor 6, and a cooling water temperature sensor 8, forming the main sensors, are connected to a microcomputer 12. The crank angle sensor 4 generates, in synchronism with a rotation of the crankshaft of an engine (not shown), a reference pulse signal illustrated in (A) of FIG. 4 for each predetermined degree of rotation such as, for example, each 120° of crankshaft rotation and an angular pulse signal of, for example, each one degree of crankshaft rotation. The knock signal generated from a knock sensor 2 is applied to the microcomputer 12 through a knock signal processing circuit 10.

The crank angle sensor 4 generates, in synchronism with the rotation of the crankshaft of The microcomputer 12 includes an input/output circuit 20 for receiving the output signals of the sensors 4 to 8 and the output signal of the processing circuit 10, a RAM 14, a ROM 16, a CPU 18 and output circuits 22, 24 for amplifying the output signals from the input/output circuit 20. The outputs of the output circuits 22, 24, i.e., a fuel injection signal and an ignition signal are respectively applied to a fuel injector 26 and an ignition coil 28 which are actuators. Also the output signal of the output circuit 24 is applied to the processing circuit 10. In response to the output signals from the sensors 4 to 8 the microcomputer 12 computes the optimum fuel injection timing and ignition timing for the engine and applies as a fuel injection signal and an ignition signal to the injector 26 and the ignition coil 28 through the output circuits 22 and 24, respectively, thereby controlling the engine in an optimum manner. This type of engine control system is disclosed in, for example, in U.S. Pat. No. 4,276,601.

Figure 3:
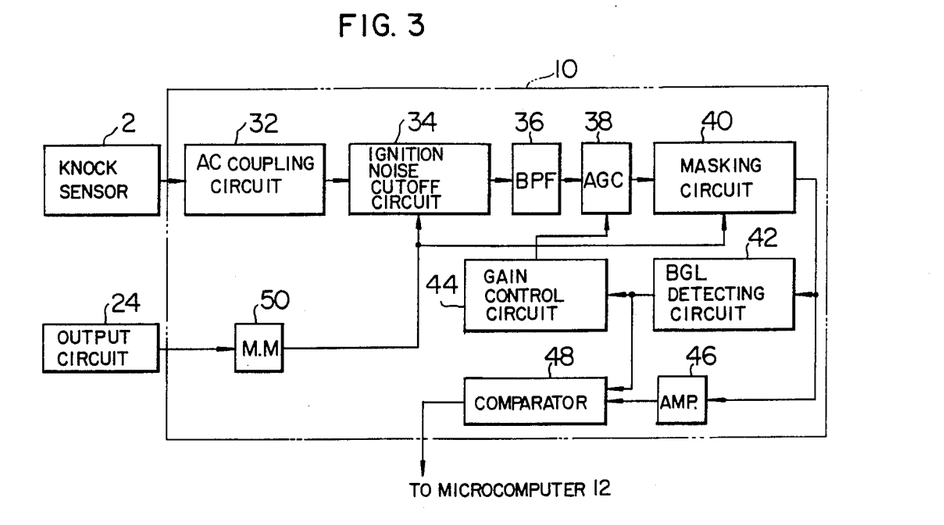
FIG. 3 is a circuit diagram of the knock signal processing circuit shown in FIG. 2.

As shown in FIG. 3, the knock signal processing circuit 10 includes an ac coupling circuit 32 for removing the dc component from the output signal of the knock sensor 2, an ignition noise cutoff circuit 34 which includes a gate and is responsive to the output of a monostable multivibrator 50 to cut off the ignition noise component from the output signal of the ac coupling circuit 32 in synchronism with the ignition timing, a band-pass filter 36 (BPF) for passing the knock signal from the output signal of the ignition noise cutoff circuit 34, 38 an automatic gain control circuit 38 (AGC circuit) responsive to the output of the BPF 36 to control the gain of its own amplifier in proportion to the input signal ratio, a masking circuit 40 responsive to the output of the monostable multivibrator 50 to mask the output of the AGC circuit 38 for a predetermined period of time, a background level (BGL) detecting circuit 42 for averaging the output of the AGC circuit 38 through the masking circuit 40 to obtain an average value of the knock signal, a gain control circuit 44 for amplifying and feeding the output of the BLG circuit 42 back to the AGC circuit 38 to control its gain, an amplifier for amplifying 46 the output of the masking circuit 40, and a comparator 48 for comparing the output voltage of the BGL circuit 42 and the output signal of the amplifier 46 to generate a knock indicative signal. The output of the comparator 48 is applied to the input/output circuit 20 of the microcomputer 12.

The circuits 32 to 48 of FIG. 3 are of the known types and their circuit constructions will not be described in detail.

Figure 4:
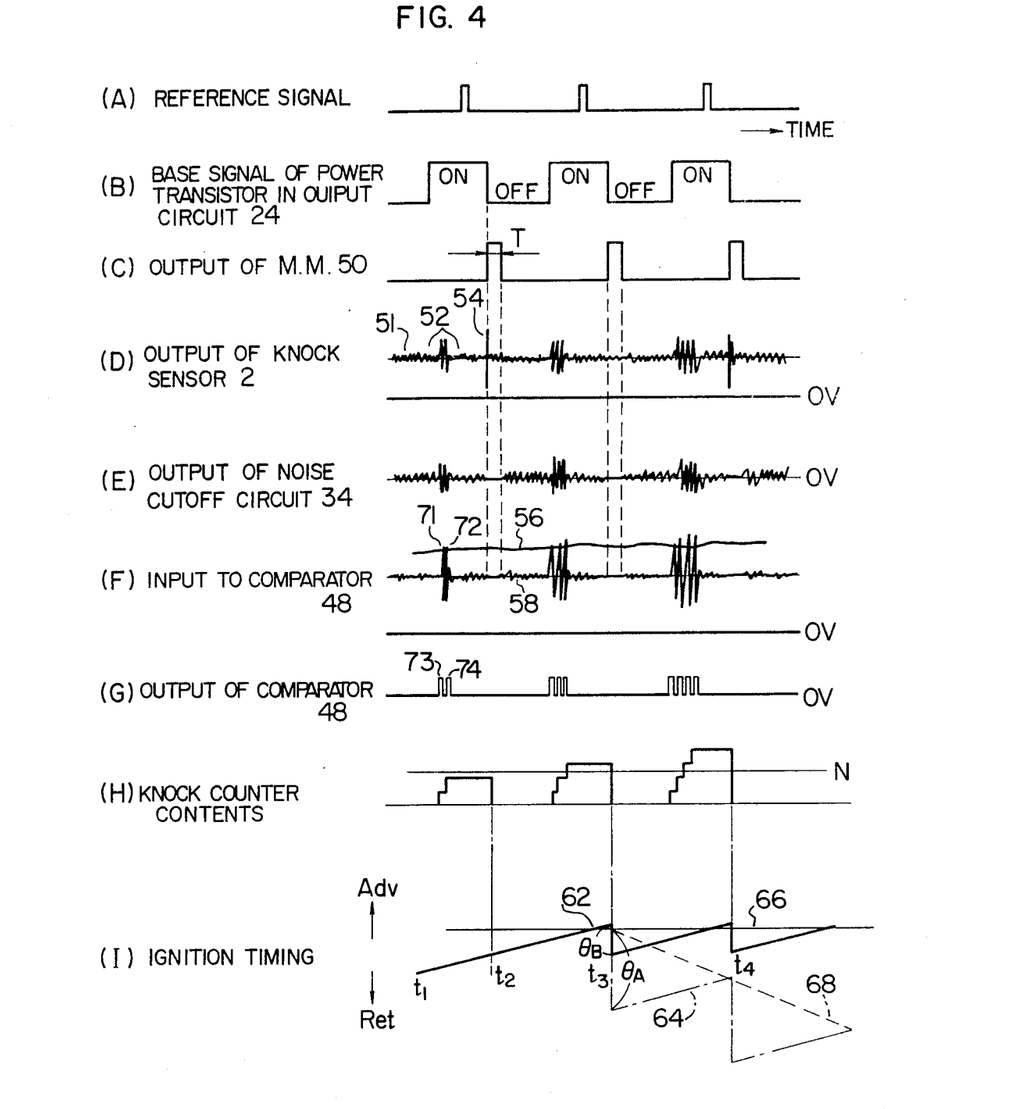

As shown in (A) of FIG. 4, a reference pulse signal is generated from the crank angle sensor 4 and the ignition timing and the fuel injection timing are determined in accordance with the reference pulse signal. In (B) of FIG. 4 the ignition timing waveform which is the base signal of the power transistor (not shown) in the output circuit 24 whereby the power transistor is turned on when the signal goes to a high level and is turned off when the signal goes to a low level.

The output of the power transistor is applied to the ignition coil 28 and the ignition coil 28 produces a spark when the power transistor is switched from the on state to the off state. The output of the power transistor is also applied to the monostable multivibrator 50 of the knock signal processing circuit 10 so that the monostable multivibrator 50 is triggered by the switching of the power transistor from the on state to the off state thereby generating a pulse signal ((C) of FIG. 4) having a predetermined time width T. Shown in (D) of FIG. 4 is the output signal of the dc biased knock sensor 2. The signal detected by the knock sensor 2 is a signal which swings on both the positive and negative sides of a dc zero level as a reference and the signal is dc biased and generated through a current regulator circuit, not shown. The knock signal includes a knock signal component 52 and an ignition noise component 54 produced by the discharge of the ignition coil 28. The output signal of the knock sensor 2 is applied to the ac coupling circuit 32. The ac coupling circuit 32 removes the dc bias component contained in the knock signal.

The removal of the dc bias by the ac coupling circuit 32 considerably improves the ignition noise cutoff efficiency of the following ignition noise cutoff circuit 34 since if the dc bias is not removed from the knock signal before cutting off the ignition noise component, it is impossible to cutoff the ignition noise component. The ignition noise cutoff circuit 34 is responsive to the output pulse of the monostable multivibrator 50 to cutoff the knock signal during the duration time T of this pulse and thus the output of the ignition noise cutoff circuit 34 has the ignition noise component 54 cutoff as shown in (E) of FIG. 4, with the output of the ignition noise cutoff circuit 34 is applied to the BPF 36. The BPF 36 emphasizing the knock signal component 52 with respect to the background signal 51 ((D) of FIG. 4) and a frequency characteristic of the BPF 36 is such that its center frequency substantially corresponds to the frequency of the knock signal component.

The AGC circuit 38 amplifies the output signal of the BPF 36 with a given gain and outputs it. The gain of the AGC circuit 38 is controlled by the feedback signal applied thereto from the BGL detecting circuit 42 through the gain control circuit 44. In other words, the gain of the gain control circuit 44 is controlled in inverse proportion to the output signal level of the BGL detecting circuit 42.

The output signal of the AGC circuit 38 is applied to the masking circuit 40, with the masking circuit 40 being responsive to the output pulse of the monostable multivibrator 50 to mask the output signal of the AGC circuit 38 during the duration time T of this pulse. When the output signal of the ignition noise cutoff circuit 34 is passed through the BPF 36, noise appears in the duration time T of the knock signal subjected to the noise cutoff by the ignition noise cutoff circuit 34 and the masking circuit 40 eliminates this noise.

The BGL detecting circuit 42 receives the output signal of the masking circuit 40 and detects an average level of the output signal.

The output signal of the BGL detecting circuit 42 is applied to one input of the comparator 48 and to the gain control circuit 44. The gain control circuit 44 amplifies the output signal of the BGL detecting circuit 42 and applies it as a feedback signal to the AGC circuit 38. The output of the masking circuit 40 is also amplified by the amplifier 46 and applied to the other input of the comparator 48.

The comparator 48 compares in level the output signal 56 ((F) of FIG. 4) of the BGL detecting circuit 42 and the output signal 58 of the amplifier 46 to generate the pulse shown in (G) of FIG. 4 each time the level of the latter exceeds the level of the former. In other words, the comparator 48 generates output pulses 73, 74 when the output signal level 56 of the BGL detecting circuit 42 are exceeded by the peaks (the knock signal components) 71, 72 of the output signal from the amplifier 46 as shown in (F) of FIG. 4.

The output pulses of the comparator 48 indicate the occurrence of knocking and they are applied, as knock detection pulses, to the input/output circuit 20 of the microcomputer 12. The knock detection pulses are applied to the RAM 14 from the input/output circuit 20 and are counted by a knock counter in the RAM 14 which is a soft counter. If the count value of the soft counter exceeds a predetermined value while the engine crankshaft rotates through a predetermined angle, the occurrence of knocking is determined and thus the ignition timing is retarded.

It is known in the art that the amount of air flow to the engine varies with the running speed of the vehicle or the engine speed. Also, the amount of air flow increases during the acceleration, that is, the amount of air supplied increases as the throttle valve opening increases.

Figure 5A:
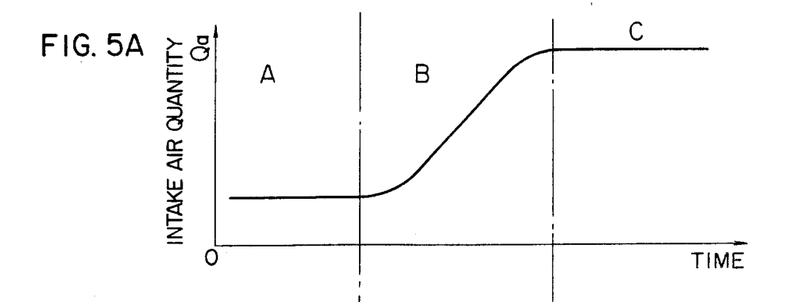
FIG. 5A is a graphical illustration of a relationship between an engine operating condition and intake air quantity.
Figure 5B:
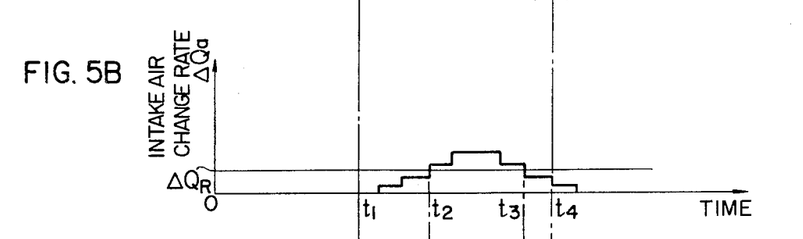
FIG. 5B is a graphical illustration of a relationship between an operating condition of the engine and a change rate in the intake air.

As shown in FIG. 5A, the intake air quantity $Q_a$ increases when the engine moves from a low speed operation indicative region A (corresponding to the region A in FIG. 1) into an acceleration operation indicative region B (corresponding to the region B in FIG. 1), and the intake air quantity $Q_a$ remains constant at a high value when the engine comes into a high speed operation region C (corresponding to the region C in FIG. 1). As will be seen from FIG. 5A, the intake air quantity $Q_a$ increases suddenly in the region B. In other words, the amount of change $\Delta Q_a$ of the intake air quantity $Q_a$ within a given time period increases during the acceleration operation as shown in FIG. 5B. Thus, by providing for the acceleration condition to be determined when the amount of change $\Delta Q_a$ equals or exceeds a predetermined value $\Delta Q_R$, it is possible to easily detect the acceleration condition.

In accordance with the invention, when knock detection signals are detected during the acceleration condition, the ignition timing is retarded a greater number of degrees than the amount of retard during the normal operation thereby preventing the occurrence of knocking.

In accordance with a first embodiment of the present invention, when the count of the knock counter is equal to or greater than the predetermined value, the amount of ignition timing retard during the acceleration operation is increased by a predetermined value over the amount of retard during the steady operation irrespective of the count value of the knock counter.

In accordance with the control program stored in the ROM 16, the microcomputer 12 computes, in response to the input data from the sensors 4 to 8, the required control data for the engine actuators, e.g., the fuel injectors and the ignition coil and applies the data to the actuators through the output circuits 22, 24 thereby controlling the engine at the desired operating condition. This type of control system is disclosed in U.S. Pat. No. 4,276,601.

Figure 7:
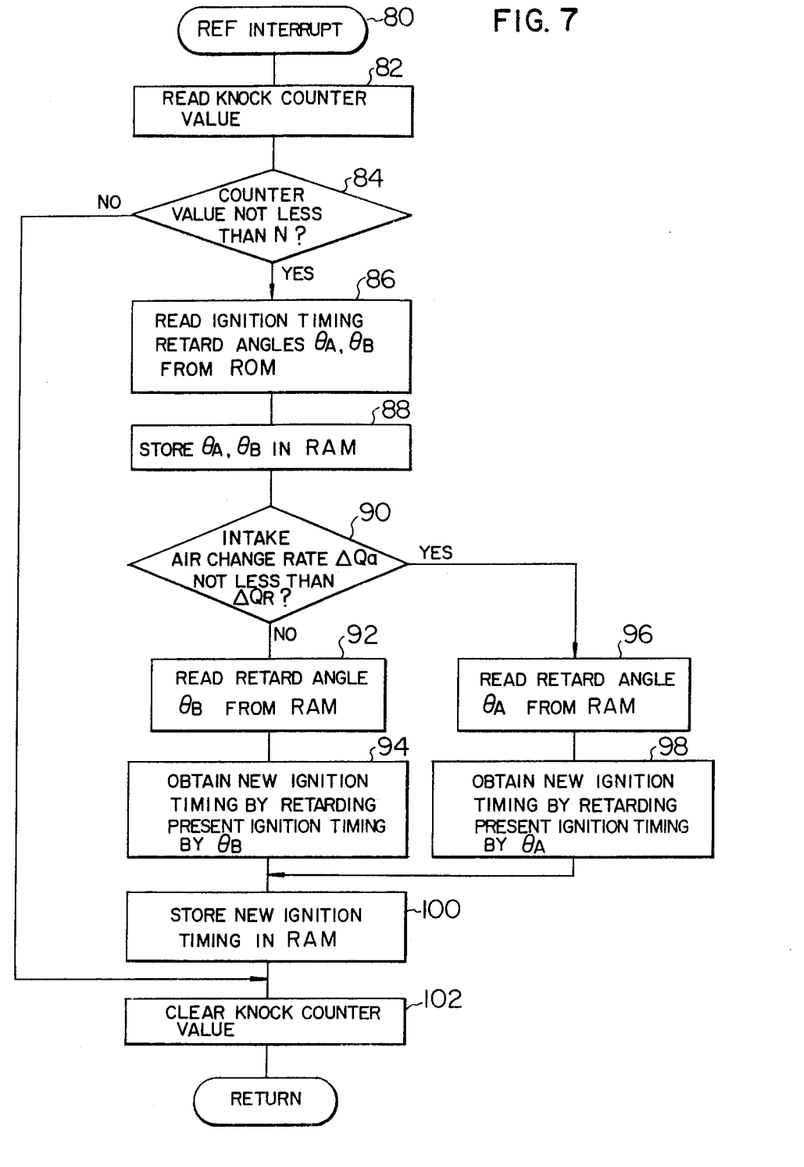
FIG. 7 is a flow chart of the knock control apparatus according to the invention.

With a control system of the aforementioned type being performed in accordance with a control program stored in the ROM 16, when a reference signal ((A) of FIG. 4) is detected through the crank angle sensor 4, a reference signal interrupt (an REF interrupt) is applied to the control program and the operations of the flow chart in FIG. 7 are performed.

When the reference signal is detected, the REF interrupt is determind first in a step 80 which, in turn, transfers to a step 82. The step 82 reads the count value of the knock counter or soft counter in the RAM 14.

A step 84 determines whether the count value of the knock counter is equal to or greater than a predetermined value N. If it is, the occurrence of knocking is determined and a transfer is made to a step 86 thereby proceeding to an ignition timing retard processing system. If the count value is less than N, the counted knock detection signals 73, 74 are determined as noise and a transfer is made to a step 102 thereby clearing the value of the knock counter. In this case, as shown in the time intervals $t_1$ to $t_3$ in (I) of FIG. 4, the ignition timing is advanced at a predetermined rate with time and the value of the knock counter is cleared at the time $t_2$. This advance processing is such that the present ignition timing stored in the RAM 14 is advanced a predetermined angle each time a predetermined time passes. In the embodiment of FIG. 7, the count value N is, for example three.

The step 86 reads ignition timing retard angles $\theta_A$, $\theta_B$ corresponding to the knocking from the ROM 16 and these retard angles $\theta_A$ and $\theta_B$ are stored in the RAM 14 by a step 88. Here, $\theta_B$ is an ignition timing retard angle used under all the engine operating conditions excluding the acceleration condition, and $\theta_A$ is an ignition timing retard angle used under the acceleration condition. The value of $\theta_A$ should preferably be selected to be two to four times that of $\theta_B$.

Then, a step 90 determines whether the amount of intake air quantity change $\Delta Q_a$ is equal to or greater than the predetermined value $\Delta Q_R$. The value of $\Delta Q_a$ is obtained by subtracting the intake air quantity $Q_a'$ measured in response to the preceeding reference signal and stored in the RAM 14 from the intake air quantity $Q_a$ measured by the air flow sensor 6 in response to the current reference signal, as follows:

$$\Delta Q_a = Q_a - Q_a'$$

If it is determined that the amount of intake air quantity change $\Delta Q_a$ is equal to or greater than the predetermined value $\Delta Q_R$, it is decided that the engine is at the acceleration operation and a transfer is made to a step 96. If it is determined that the engine is not accelerating, a transfer is made to a step 92. During the acceleration period, the intake air quantity $Q_a$ varies as shown in FIG. 5A so that the value of $\Delta Q_a$ varies as shown in FIG. 5B and the time interval $t_1$ to $t_3$ is determined as the acceleration period. The step 92 reads from the RAM 14 the retard angle $\theta_B$ corresponding to the operating conditions other than the acceleration condition and then a step 94 obtains as a new ignition timing the value resulting from the retardation of the current ignition timing by $\theta_B$. The next step 100 stores the new ignition timing in the RAM 14 and transfers to the step 102 thereby clearing the value of the knock counter. The time of ignition is controlled in accordance with the new ignition timing. In other words, as shown in (I) of FIG. 4, the ignition timing is retarded by the value of $\theta_B$ at the time $t_3$ and thereafter the ignition timing is advanced at a predetermined rate.

The step 96 reads the ignition timing retard angle $\theta_A$ from the RAM 14 and the next step 98 obtains, as a new ignition timing, the value resulting from the retardation of the current ignition timing by the value of $\theta_A$. The new ignition timing is stored in the RAM 14 by the step 100. Then, similarly a transfer is made to the step 102 and the value of the knock counter is cleared. The ignition timing retard characteristic of this first embodiment is shown in FIG. 6.

Figure 5C:
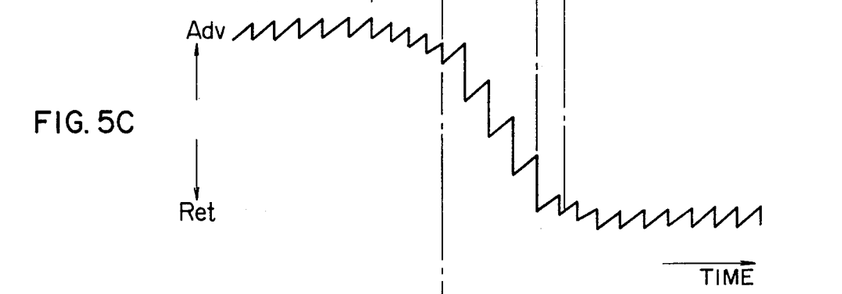
FIG. 5C is a graphical illustration of the advance in retarding of the ignition with respect to time.
Figure 6:
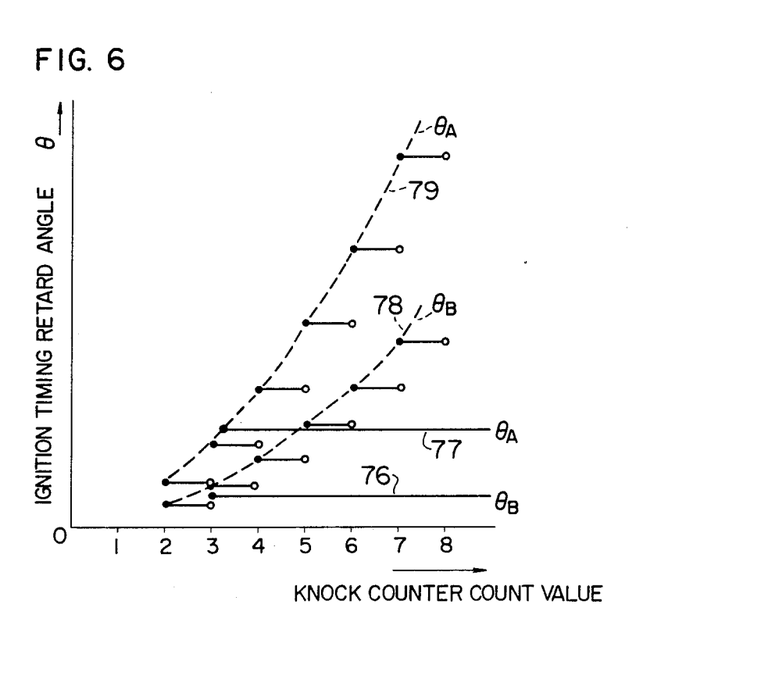
FIG. 6 is a characteristic diagram showing graphical illustration of ignition timing retard provided by the knock control apparatus of this invention.

In other words, when knock occurs, if the engine is not accelerating and if the count value of the knock counter is greater than the predetermined value of three in the embodiment of FIG. 7, the ignition timing retard angle is maintained at the constant value $\theta_B$ as shown by a straight line 76 in FIG. 6 irrespective of the count value and therefore the ignition timing is maintained substantially constant along a knock limiting line 66 as shown in (I) of FIG. 4. If the engine is at the acceleration operation, the retard angle is maintained at the greater constant value $\theta_A$ as shown by a straight line 77 irrespective of the count value of the knock counter and consequently the ignition timing is retarded along a knock limiting line 68 as shown in (I) of FIG. 4. If the count value is less than two, the retard angle is zero and the ignition timing is gradually advanced. Thus, in accordance with the embodiment, of FIG. 7 upon an occurrence of knocking during the acceleration condition corresponding to the time interval $t_2$ to $t_3$ the ignition timing retard angle is increased considerably as shown in FIG. 5C and thus the ignition timing control value follows the knock limiting line $a_1$ shown in FIG. 1 thereby preventing the occurrence of heavy knocking.

The second embodiment of the present invention is designed so that if the value of the knock counter is equal to or greater than the predetermined value, the ignition timing retard angle during the acceleration operation is increased over that during the normal operation, and the retard angle is increased with an increase in the count value of the knock counter.

The operation of this embodiment is substantially the same with the flow chart of the first embodiment shown in FIG. 7 and thus it will be described with reference to the flow chart of FIG. 7.

To begin with, when a reference signal is detected, the step 80 determines as REF interrupt and transfers to the step 82. The step 82 reads the count value of the knock counter in the RAM 14 which is a soft counter. The step 84 determines whether the count value is equal to or greater than the predetermined value N. If it is, the occurrence of knocking is determined and a transfer is made to the step 86 thereby proceeding to the ignition timing retard processing system. If the count value is less than the value N, the counted knock detection signals 73, 74 are determined as noise and a transfer is made to the step 102 thereby clearing the value of the knock counter.

The step 86 reads, from the map in the ROM 16, the ignition timing retard angles $\theta_A$, $\theta_B$ under a knocking condition which correspond to the count value and the step 88 stores these retard angles in the RAM 14.

The map in the ROM 16 stores the data shown by curves 78, 79 in FIG. 6, that is, ignition timing retard angles for normal and acceleration operations corresponding to the count values of the knock counter are stored. In this embodiment, it is selected $N=2$.

The subsequent operations are the same with the first embodiment and the processing proceeds through the steps 90 to 102.

Thus, in accordance with the second embodiment, when knocking occurs, the ignition timing retard angle is increased as the count value of the knock counter increases and also the retard angle for the acceleration operation is selected to be two-four times that for the normal operation. In accordance with the second embodiment, the retard angle is controlled in response to the count value of the knock counter and thus the occurrence of heavy knocking is prevented under all the operating conditions, particularly the acceleration condition.

In accordance with a third embodiment, of the present invention when the acceleration condition is detected under the knocking condition, it is considered that thereafter the acceleration condition lasts for a predetermined time and the ignition timing retard angle during this time is increased over that used for the steady operation.

Figure 8:
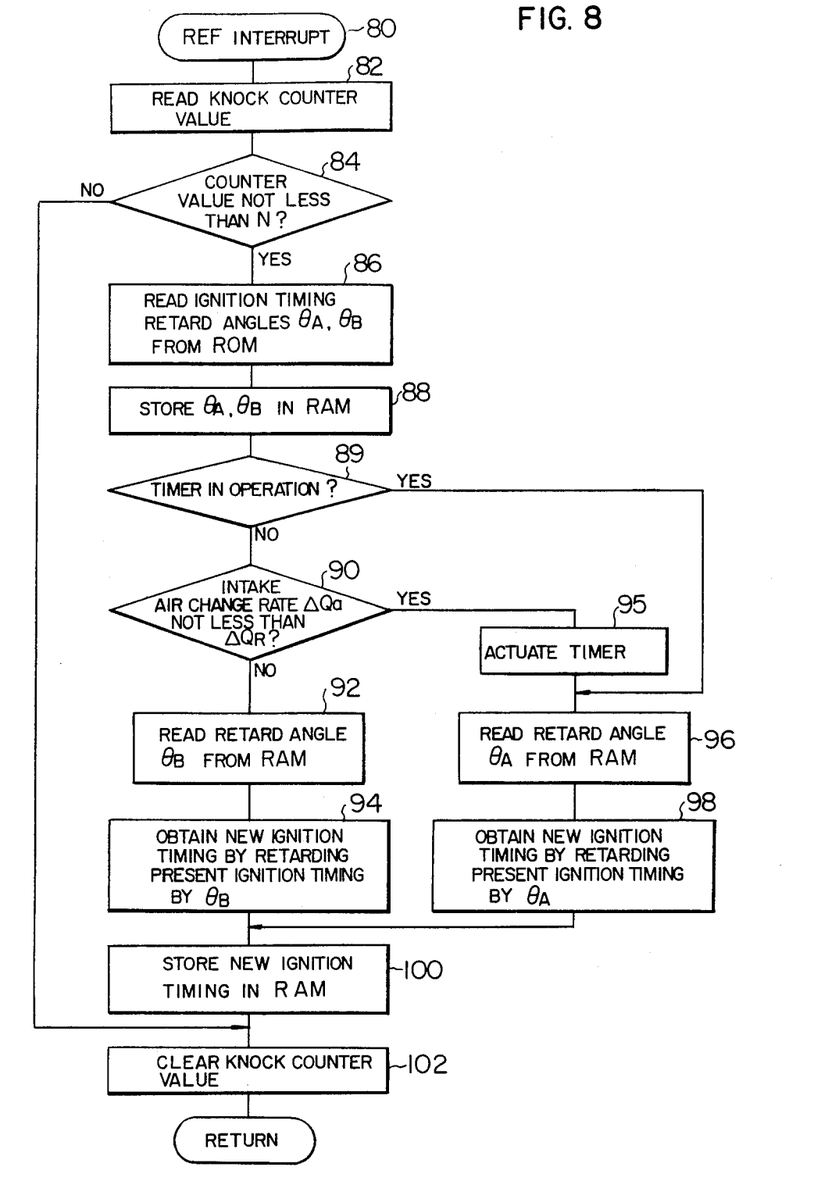
FIG. 8 is a flow chart useful of another embodiment of the invention.

In the flow chart of FIG. 8 steps 80 to 88 are the same with their counterparts of the first embodiment. A step 89 checks whether the soft timer in the RAM 14 is in operation so that if it is, the knocking under the acceleration condition is determined and a transfer is made to a step 96. If the timer is not in operation, a transfer is made to a step 90 which, in turn, determines whether the amount of intake air quantity change $\Delta Q_a$ is equal to or greater than the predetermined value $\Delta Q_{Ro}$.

Figure 5D:
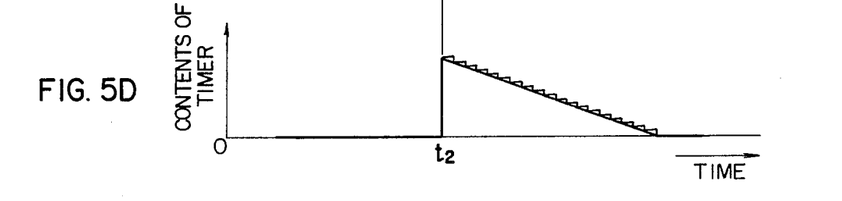
FIG. 5D is a graphical illustration of the contents of a timer with respect to time.

If the step 90 determines that $\Delta Q_a \geq \Delta Q_R$, it transfers to a step 95 and the soft timer is actuated. In other words, the soft timer may, for example, be a subtraction counter such that a predetermined value is set in the subtraction counter at the time $t_2$ as shown in FIG. 5D and, thereafter, the value of the timer is decreased by one at intervals of a predetermined time. When the subtraction counter is performing the subtraction operation, the timer is in operation, and the timer is no longer in operation when the contents of the subtraction counter are reduced to zero. The operation time of the timer is selected to be, for example, one second after its actuation.

After the completion of the step 95, a transfer is made to the step 96 so that the retard angle according to the characteristic curve 77 or 79 of FIG. 6 is read and steps 98 to 102 are performed in the same manner as the first embodiment.

If the step 90 determines that $\Delta Q_a < \Delta Q_R$, it transfers to a step 92 so that the retard angle according to the characteristic curve 76 or 78 of FIG. 6 is read and steps 94, 100 and 102 are performed.

It will thus be seen that in accordance with the third embodiment, when the occurrence of knocking is detected during the acceleration operation, the timer is actuated and the ignition timing retard angle is retarded greatly for the predetermined time thus preventing the occurrence of heavy knocking.

Thus, according to the present inventin, an amount of retard of ignition timing provided upon occurrence of knocking in an acceleration condition is increased as compared with that provided during the steady operating condition, so that a period during which knocking occurs can be shortened and the occurrence of heavy knocking is prevented even in the acceleration condition.

What is claimed is:

1. A knock control apparatus for an internal combustion engine comprising:
   sensor means for generating signals indicative of operation conditions of an engine;
   actuator means response to control signals from said sensor means to control energy conversion functions of said engine;
   knock sensing means for sensing a presence or absence of knocking in said engine and generating a knock detection signal indicative of an occurrence of knocking;
   control circuit means responsive to the signals from said sensor means to perform engine controlling data processing operations and thereby supply engine control values to said actuator means, said control circuit means including first means for detecting an acceleration of said engine on a basis of output signals from said sensor means, memory means for storing first data of an ignition timing retard angle in an accelerated state of the engine and second data of an ignition time retard angle which is less than said first data in engine operational states other than the acceleration state, and second means for selectively reading out from said memory means one of said first and second data in response to said knock detection signal and for supplying the readout data to said actuator means to thereby retard the ignition timing by an angle corresponding to the read out data, and said second means reads out said first data when it is detected that said engine is in the acceleration state and reads out the second data when the engine is in another operational state.

2. An apparatus according to claim 1, wherein an amount of said first data of ignition timing retard angle for acceleration operation is substantially two or more times larger than an amount of said second data of ignition timing retard angle.

3. An apparatus according to claim 2, wherein said control circuit means further includes counter means for counting the number of said knock detection signals for each predetermined angular rotation of the crankshaft of the engine, said memory means stores a first group of ignition time retard angles as said first data and a second group of ignition timing retard angles as said second data, and said second means reads out one of said first group of ignition timing retard angles in accordance with the number of said knock detection signals counted by said counter means within said predetermined angular rotation when it is detected that said engine is in the acceleration state and reads out one of said second group of ignition timing retard angles in accordance with the number of said knock detection signals counted by said counter means within said predetermined angular rotation when it is detected that said engine is in the states other than the acceleration state.

4. An apparatus according to claim 3, wherein said second means does not read out any of said first or second data from said memory means when the number of said knock detection signals counted by said counter means within said predetermined angular rotation is less than a pregiven number to thereby not retard the ignition timing.

5. An apparatus according to claim 1, wherein said control circuit means further includes counter means for counting the number of knock detection signals for each predetermined angular rotation a crankshaft of said engine, said memory means storing a first ignition timing retard angle as said first data and a second ignition timing retard angle as said second data, and said second means selectively reading out one of said first and second data irrespective of the number of said knock detection signals counted by said counter means within said predetermined angular rotation.

6. An apparatus according to claim 5, wherein said second means does not read out any of said first or second data from said memory means when the number of knock detection signals counted by said counter means within said predetermined angular rotation is less than a predetermined number to thereby not retard the ignition timing.

7. An apparatus according to claim 1, wherein said sensor means includes a sensor for detecting an intake air quantity of said engine, and wherein said first means detects that said engine is in an acceleration state when a rate of change of said detected intake air quantity is greater than a predetermined value.

8. An apparatus according to claim 7, wherein, when an acceleration state of said engine is detected by said first means, said second means reads out said first data and applies it to said actuator means for a predetermined period of time in response to said knock detection signal.

9. A knock control apparatus for an internal combustion engine, the knock control apparatus comprising:
   sensor means for generating signals indicative of operational states of the engine;
   actuator means responsive to control signals for controlling energy conversion functions of said engine;
   knock sensing means for sensing a presence or absence of knocking in said engine and generating a knock detection signal indicative of an occurrence of knocking;
   control circuit means responsive to the signals from said sensor means for performing engine controlling data processing operations and thereby supplying engine control values to said actuator means, said control circuit means including first means for detecting an acceleration of said engine on the basis of output signals from said sensor means, memory means for storing first data of an ignition timing retard angle in an accelerated state and second data of an ignition time retard angle which is less than said first data in engine operational states other than the acceleration state, and second means for selective reading out from said memory means one of said first and second data in response to said knock detection signal and for supplying the read-out data to said actuator means to thereby retard the ignition timing by an angle corresponding to the read out data, said second means reads out said first data when it is detected that said engine is in the acceleration state and reads out the second data when the engine is another operational state.

10. An apparatus according to claim 9, wherein an amount of said first data of ignition timing retard angle for acceleration operation is substantially two or more times larger than an amount of said second data of ignition timing retard angle.

11. An apparatus according to claim 9, wherein said control circuit means further includes counter means for counting the number of knock detection signals for each predetermined angular rotation a crankshaft of said engine, said memory means storing a first ignition timing retard angle as seaid first data and a second ignition timing retard angle as said second data, and said second means selectively reading out one of said first and second data irrespective of the number of said knock detection signals counted by said counter means within said predetermined angular rotation.

12. An apparatus according to claim 9, wherein said sensor means includes a sensor for detecting an intake air quantity of said engine, and wherein said first means detects that said engine is in an acceleration state when a rate of change of said detected intake air quantity is greater than a predetermined value.

13. An apparatus according to claim 12, wherein, when an acceleration state of said engine is detected by said first means, said second means reads out said first data and applies it to said actuator means for a predetermined period of time in response to said knock detection signal.

14. A method of operating a knock control system for an internal combustion engine including: sensor means for generating signals indicative of operating conditions of an engine; actuator means responsive to control signals to control engine conversion functions of said engine; knock sensing means for sensing the presence or absence of knocking in said engine and generating a knock detection signal indicative of an occurrence of a knocking; and control circuit means responsive to the signals from said sensor means to perform engine controlling data processing operations and thereby supply engine control values to said actuator means, said control circuit means including memory means for storing a first data of ignition timing retard angle in an acceleration state and a second data of ignition timing retard angle which is less than said first data in engine operation states other than the acceleration state; the method comprising the steps of:
  a first step of determining whether said engine is in an acceleration state or states other than the acceleration state in accordance with output signals from said sensor means;
  a second step of reading out from said memory means selectively one of said first and second data in response to said knock detection signal in a manner such that said first is read out when it is determined that said engine is in the acceleration state and said second data is read out in another state; and
  a third step of supplying the read out data to said actuator means from said control circuit means to thereby retard the ignition timing by an angle corresponding to the read out data.

15. A method according to claim 14, wherein said sensor means includes a sensor for detecting an intake air quantity of said engine, and wherein said first step determines that said engine is in an acceleration state when a rate of change of said detected intake air quantity is greater than a predetermined value.

16. A method according to claim 14, wherein an amount of said first data of ignition timing retard angle for acceleration operation is substantially two or more times greater than an amount of said second data of ignition timing retard angle.

17. A method according to claim 16, wherein said memory means stores a first group of ignition timing retard angles as said first data and a second group of ignition timing retard angles as said second data, and said method further includes:
  a fourth step of counting the number of said knock detection signals for each predetermined angular rotation of a crankshaft of the engine, said second step selectively reading out one of said first group of ignition timing retard angles in accordance with the number of said knock detection signals counted in said fourth step within said predetermined angular rotation when it is detected that said engine is in an acceleration state and reads out one of said second group of ignition timing retard angles in accordance with the number of said knock detection signals counted in said fourth step within said predetermined angular rotation when it is detected that said engine is in states other than the acceleration state.

18. An apparatus according to claim 17, wherein, when an acceleration state of said engine is detected in said first step, said second means reads out from said third step and applies said first data to said actuator means for a predetermined period of time in response to said knock detection signal.

19. A method according to claim 16, wherein said memory means stores a first ignition timing retard angle as said first data and a second ignition timing retard angle as said second data, and wherein said method further includes:
  a fourth step of counting the numer of said knock detection signals for each predetermined angular rotation of a crankshaft of the engine, said second step selectively reading out one of said first and second data regardless of the number of said knock detection signals counted in said fourth step within said predetermined angular rotation of the crankshaft.

20. A method according to claim 19, wherein said second step does not read out any of said first or second data from said memory means when the number of said knock detection signals counted in said fourth step within said predetermined angular rotation is less than a predetermined number to thereby not retard the ignition timing.

21. A method according to claim 19, wherein said second step does not read out any of said first or second data from said memory means when the number of said knock detection signals counted in said fourth step within said predetermined angular rotation is less than a predetermined number to thereby not retard the ignition timing.

* * * * *